(12) United States Patent
Hebein et al.

(10) Patent No.: US 12,245,305 B2
(45) Date of Patent: Mar. 4, 2025

(54) MAINTAINING CONCURRENT SERVICES IN A DUAL ACTIVE MODE

(71) Applicant: QUALCOMM Incorporated, San Diego, CA (US)

(72) Inventors: Adam Hebein, San Diego, CA (US); Manisha Priyadarshini, San Diego, CA (US); Qin Xue Frantti, San Diego, CA (US); Brian A'Hearn, San Diego, CA (US); Rishav Rej, San Diego, CA (US); Qingxin Chen, San Diego, CA (US); Uttam Pattanayak, San Diego, CA (US); Vikram Singh, San Diego, CA (US); Bhupesh Manoharlal Umatt, Poway, CA (US); Carlos Marcelo Dias Pazos, Carlsbad, CA (US); Cherng-Shung Hsu, San Diego, CA (US); Osama Lotfallah, San Diego, CA (US); Flora Pui San Chan, San Diego, CA (US); Abhishek Bhatnagar, San Diego, CA (US); Reza Shahidi, San Diego, CA (US); Cheol Hee Park, San Diego, CA (US); Subashini Krishnamurthy, San Diego, CA (US); Sandeep Ramannavar, San Diego, CA (US); Jun Hu, San Diego, CA (US); Shailesh Maheshwari, San Diego, CA (US); Hemanth Kumar Rayapati, San Diego, CA (US); Krishna Chaitanya Mukkera, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 448 days.

(21) Appl. No.: 17/650,169

(22) Filed: Feb. 7, 2022

(65) Prior Publication Data
US 2023/0010736 A1    Jan. 12, 2023

Related U.S. Application Data

(60) Provisional application No. 63/219,678, filed on Jul. 8, 2021.

(51) Int. Cl.
*H04W 76/15* (2018.01)
*H04W 24/10* (2009.01)

(52) U.S. Cl.
CPC .......... *H04W 76/15* (2018.02); *H04W 24/10* (2013.01)

(58) Field of Classification Search
CPC ............................ H04W 76/15; H04W 24/10
(Continued)

(56) References Cited

U.S. PATENT DOCUMENTS 11,438,895 B2* 9/2022 Li ..................... H04W 72/0453
11,496,619 B2* 11/2022 Zheng ..................... H04W 8/22
(Continued)

FOREIGN PATENT DOCUMENTS

WO    2018053746 A1    3/2018

OTHER PUBLICATIONS

International Search Report and Written Opinion—PCT/US2022/072381—ISA/EPO—Sep. 6, 2022.
(Continued)

*Primary Examiner* — Melvin H Pollack
(74) *Attorney, Agent, or Firm* — QUALCOMM Incorporated

(57) ABSTRACT

Various aspects of the present disclosure generally relate to wireless communication. In some aspects, a user equipment (UE) may establish, using a first subscription of the UE, a
(Continued)

first communication connection associated with a first service. The UE may establish, using a second subscription of the UE, a second communication connection associated with a second service. The UE may operate in a dual subscriber identity module (SIM) dual active (DSDA) mode based at least in part on establishing the first communication connection and establishing the second communication connection. The UE may perform an action to maintain concurrent services, including the first service and the second service, while operating in the DSDA mode. Numerous other aspects are described.

30 Claims, 7 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 11,659,602 B2* | 5/2023 | Li | ................ | H04W 48/18 370/310 |
| 11,672,035 B2* | 6/2023 | Jung | ................ | H04W 4/40 370/235 |
| 11,736,947 B2* | 8/2023 | Tamura | ................ | H04M 1/675 455/411 |
| 11,792,767 B2* | 10/2023 | Ryu | ................ | H04W 76/18 455/458 |
| 11,797,472 B2* | 10/2023 | Sevindik | ................ | G06F 15/17331 |
| 11,838,812 B1* | 12/2023 | Dharmadhikari | ................ | H04W 8/04 |
| 11,838,973 B2* | 12/2023 | Han | ................ | H04W 76/15 |
| 11,864,251 B2* | 1/2024 | Han | ................ | H04L 65/1104 |
| 11,901,999 B2* | 2/2024 | Zhang | ................ | H04W 52/281 |
| 11,903,095 B2* | 2/2024 | Mishra | ................ | H04W 92/20 |
| 11,910,216 B2* | 2/2024 | Li | ................ | H04W 72/0453 |
| 11,910,482 B2* | 2/2024 | Ou | ................ | H04W 8/24 |
| 11,917,464 B2* | 2/2024 | Saad | ................ | H04W 36/00833 |
| 11,917,478 B2* | 2/2024 | Bongaarts | ................ | H04W 36/30 |
| 11,929,794 B2* | 3/2024 | Zhang | ................ | H04B 7/0695 |
| 11,937,132 B2* | 3/2024 | Shan | ................ | H04W 36/26 |
| 11,949,495 B2* | 4/2024 | Ravishankar | ................ | H04B 7/18539 |
| 11,949,607 B2* | 4/2024 | Noh | ................ | H04W 72/30 |
| 11,950,279 B2* | 4/2024 | Cirik | ................ | H04W 76/18 |
| 11,968,588 B2* | 4/2024 | Parichehrehteroujeni | ................ | H04W 36/324 |
| 11,979,759 B2* | 5/2024 | Li | ................ | H04W 24/08 |
| 11,985,645 B2* | 5/2024 | Venkata | ................ | H04L 5/0007 |
| 2016/0219421 A1 | 7/2016 | Shi et al. | | |
| 2020/0008093 A1 | 1/2020 | Soriaga et al. | | |
| 2023/0118286 A1* | 4/2023 | Mao | ................ | H04W 12/45 455/558 |
| 2023/0180218 A1* | 6/2023 | Lovlekar | ................ | H04W 8/22 370/329 |
| 2023/0189209 A1* | 6/2023 | Jung | ................ | H04W 48/12 370/329 |
| 2023/0189212 A1* | 6/2023 | Chen | ................ | H04W 68/12 455/458 |
| 2023/0239941 A1* | 7/2023 | Selvaganapathy | ................ | H04W 8/26 370/328 |
| 2023/0254684 A1* | 8/2023 | Abraham | ................ | H04W 72/51 455/414.1 |
| 2023/0262446 A1* | 8/2023 | Kim | ................ | H04W 76/30 455/422.1 |
| 2023/0262657 A1* | 8/2023 | Kim | ................ | H04W 76/30 455/458 |
| 2023/0276291 A1* | 8/2023 | Ibrahim | ................ | H04W 72/0453 370/328 |
| 2023/0284308 A1* | 9/2023 | Prabhakar | ................ | H04W 76/16 370/329 |
| 2023/0345417 A1* | 10/2023 | Wu | ................ | H04W 76/30 |
| 2024/0163762 A1* | 5/2024 | Goto | ................ | H04W 36/144 |

OTHER PUBLICATIONS

VIVO (Moderator): "Report of Phase 1 Multi-SIM Email Discussion", 3GPP Draft, 3GPP TSG-RAN WG Meeting #85, RP-191898, 3rd Generation Partnership Project (3GPP), Mobile Competence Centre, 650, Route Des Lucioles, F-06921 Sophia-Antipolis Cedex, France, Newport Beach, USA, Sep. 16-20, 2019, Sep. 20, 2019, 36 Pages, XP051782444.

* cited by examiner

MAINTAINING CONCURRENT SERVICES IN A DUAL ACTIVE MODE

CROSS-REFERENCE TO RELATED APPLICATION

This Patent Application claims priority to U.S. Provisional Patent Application No. 63/219,678, filed on Jul. 8, 2021, entitled "MAINTAINING CONCURRENT SERVICES IN A DUAL ACTIVE MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for maintaining concurrent services in a dual active mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to establish, using a first subscription of the UE, a first communication connection associated with a first service. The one or more processors may be configured to establish, using a second subscription of the UE, a second communication connection associated with a second service. The one or more processors may be configured to operate in a dual subscriber identity module (SIM) dual active (DSDA) mode based at least in part on establishing the first communication connection and establishing the second communication connection. The one or more processors may be configured to perform an action to maintain concurrent services, including the first service and the second service, while operating in the DSDA mode.

Some aspects described herein relate to a method of wireless communication performed by a UE. The method may include establishing, using a first subscription of the UE, a first communication connection associated with a first service. The method may include establishing, using a second subscription of the UE, a second communication connection associated with a second service. The method may include operating in a DSDA mode based at least in part on establishing the first communication connection and establishing the second communication connection. The method may include performing an action to maintain concurrent services, including the first service and the second service, while operating in the DSDA mode.

Some aspects described herein relate to a non-transitory computer-readable medium that stores a set of instructions for wireless communication by a UE. The set of instructions, when executed by one or more processors of the UE, may cause the UE to establish, using a first subscription of the UE, a first communication connection associated with a first service. The set of instructions, when executed by one or more processors of the UE, may cause the UE to establish, using a second subscription of the UE, a second communication connection associated with a second service. The set of instructions, when executed by one or more processors of the UE, may cause the UE to operate in a DSDA mode based at least in part on establishing the first communication connection and establishing the second communication connection. The set of instructions, when executed by one or more processors of the UE, may cause the UE to perform an action to maintain concurrent services, including the first service and the second service, while operating in the DSDA mode.

Some aspects described herein relate to an apparatus for wireless communication. The apparatus may include means for establishing, using a first subscription of the apparatus, a first communication connection associated with a first service. The apparatus may include means for establishing, using a second subscription of the apparatus, a second communication connection associated with a second service. The apparatus may include means for operating in a DSDA mode based at least in part on establishing the first communication connection and establishing the second communication connection. The apparatus may include means for performing an action to maintain concurrent services, including the first service and the second service, while operating in the DSDA mode.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
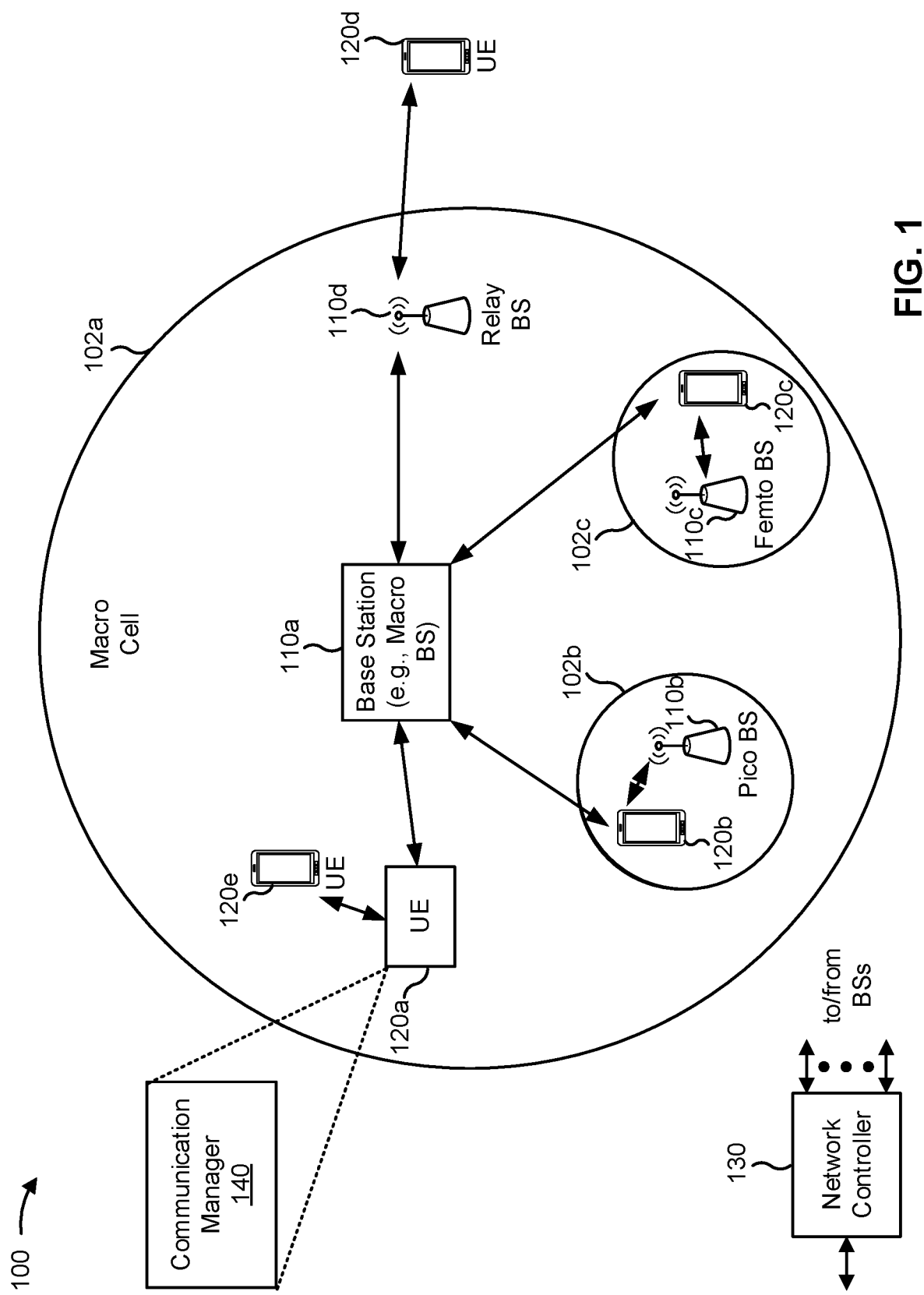
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some cases, a UE 120 may be a multi-subscriber identity module (SIM) UE. For example, the UE 120 may communicate with a first base station 110 using a first SIM. The UE 120 may communicate with a second base station 110 using a second SIM. Each SIM may be associated with a subscription. A subscription may be a subscription with a network operator (for example, a mobile network operator (MNO)) that enables the UE 120 to access a wireless network (for example, a radio access network (RAN)) associated with the network operator.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may establish, using a first subscription of the UE, a first communication connection associated with a first service; establish, using a second subscription of the UE, a second communication connection associated with a second service; operate in a dual SIM dual active (DSDA) mode based at least in part on establishing the first communication connection and establishing the second communication connection; and perform an action to maintain concurrent services, including the first service and the second service, while operating in the DSDA mode. Additionally, or alternatively, the communication manager 140 may perform one or more other operations described herein. For example, the communication manager 140 may refrain from transmitting a first measurement report associated with the first subscription based at least in part on a first priority of the first service and a second priority of the second service. The communication manager 140 may detect an initiation of the voice call associated with the first subscription; detect that the voice call is associated with a transition to a RAT or frequency band that results in a RAT combination or a frequency band combination that is not compatible with the DSDA mode; end the voice call associated with the first subscription; and/or transmit information to cause a notification to be displayed by the UE, wherein the notification indicates that the voice call was ended due to a concurrent activity of the voice call and the second service.

As indicated above, FIG. 1 is provided as an example. Other examples may differ from what is described with regard to FIG. 1.

Figure 2:
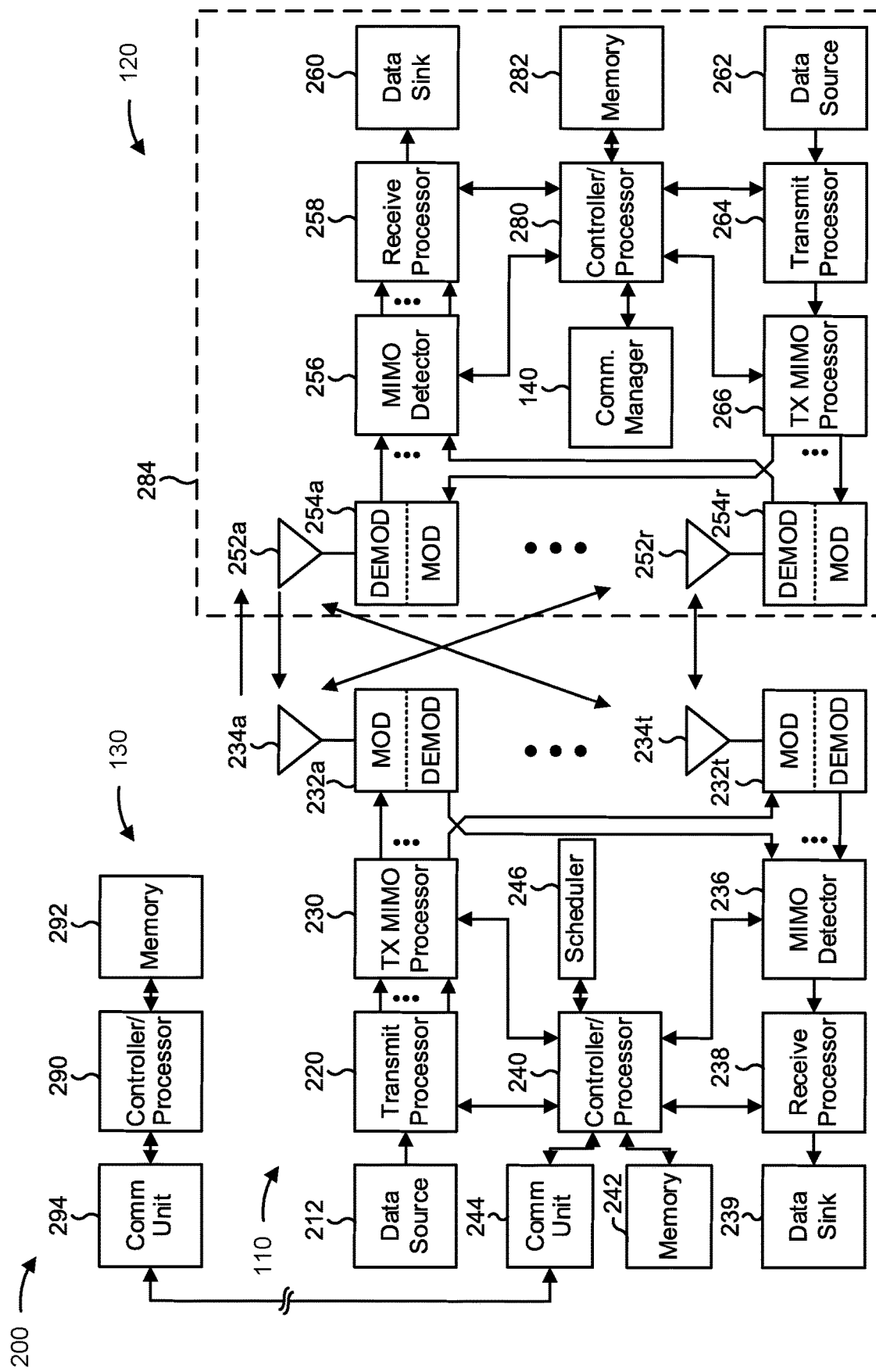
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of the base station 110, the controller/processor 280 of the UE 120, and/or any other component(s) of FIG. 2 may perform one or more techniques associated with maintaining concurrent services in a dual active mode, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for establishing, using a first subscription of the UE, a first communication connection associated with a first service; means for establishing, using a second subscription of the UE, a second communication connection associated with a second service; means for operating in a DSDA mode based at least in part on establishing the first communication connection and establishing the second communication connection; and/or means for performing an action to maintain concurrent services, including the first service and the second service, while operating in the DSDA mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
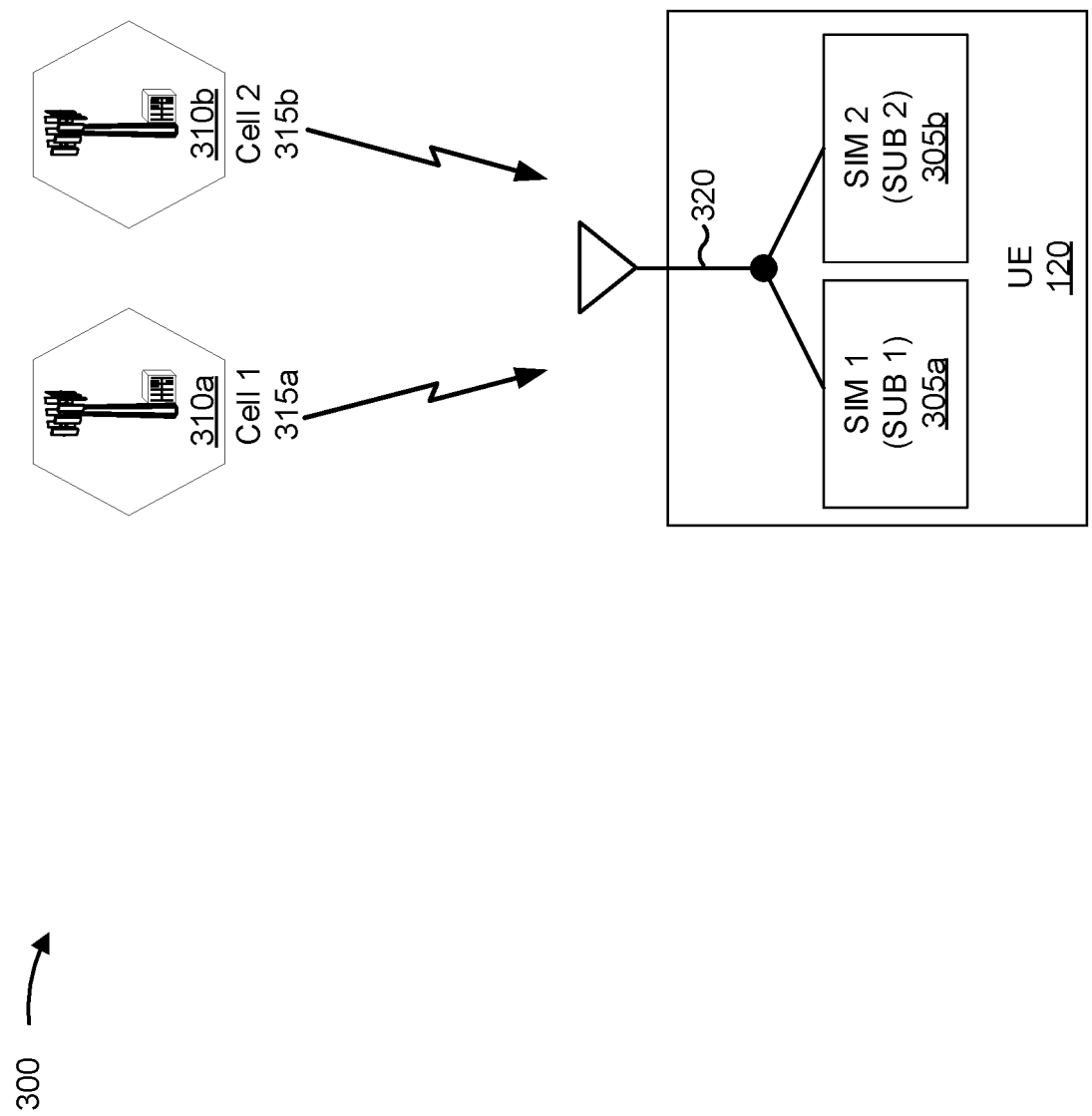
FIG. 3 is a diagram illustrating an example of a multi-subscriber identity module (SIM) UE, in accordance with the present disclosure.

FIG. 3 is a diagram illustrating an example 300 of a multi-SIM UE, in accordance with the present disclosure. As shown in FIG. 3, a UE 120 may be a multiple SIM (multi-SIM) UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may be a subscription with a network operator (for example, an MNO) that enables the UE 120 to access a wireless network (for example, a RAN) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (MSMA) mode, such as a DSDA mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMs of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. Similarly, the UE 120 may be capable of operating in a DSDA mode for a first combination of frequency bands (e.g., operating frequency bands) and may not be capable of operating in a DSDA mode for a second combination of frequency bands. This UE design reduces design costs as compared to enabling the UE 120 to operate using the DSDA mode for the second combination of RATs. A permissible RAT combination for the DSDA mode may be referred to herein as "DSDA compatible RAT combination." Similarly, a permissible frequency band combination for the DSDA mode may be referred to herein as a "DSDA compatible frequency band combination."

In some cases, a multi-SIM UE may be capable of switching between two separate mobile network services or concurrently using two separate mobile network services, may include hardware for maintaining multiple connections (for example, one connection per SIM) in a standby state, or may include hardware (for example, multiple transceivers) for maintaining multiple network connections at the same time, among other examples. A DSDA UE may be capable of communicating on two connections at a given time, such as for multiple communications associated with different RATs or multiple communications of a single RAT. The communication on two connections may be handled by a radio frequency (RF) hardware front-end module (sometimes referred to as a radio frequency front-end (RFFE)), which is illustrated in a general sense by reference number 320. The RF hardware front-end module may include, for example, one or more power amplifiers (PAs), one or more low noise amplifiers (LNAs), one or more band filters, one or more band N-plexers, one or more band switches, and/or one or more antenna switches, among other examples.

In a multi-SIM mode such as a DSDA mode, a default data SIM (DDS) subscription may perform data activity, call activity, or the like. A non-DDS subscription may perform call-related activity, small data activity (e.g., short message service (SMS) activity or multimedia message service (MMS) activity), or similar tasks. "Subscriber" and/or "subscription" is used interchangeably with "SIM" herein.

In some cases, a first service associated with a first subscription and a second service associated with a second subscription may be concurrently active (e.g., may have concurrently established communications). In such a situation, the UE may perform concurrent transmissions for two subscriptions, concurrent receptions for two subscriptions, or concurrent transmission for a first subscription and receptions for a second subscription. For example, the concurrently active services may communicate on a shared RF hardware front-end module or may share an antenna switch.

As mentioned above, a DSDA configuration allows a UE to have multiple concurrently active services associated with multiple subscribers, such as a first service associated with a DDS subscriber and a second service associated with a non-DDS subscriber. Thus, a UE may be capable of establishing calls, such as voice calls (e.g., mobile-originated (MO) calls, mobile-terminated (MT) calls, data calls, enhanced 911 calls, gaming traffic, and/or calls associated with a threshold quality of service), and/or other services (such as gaming traffic, internet data, and/or SMS traffic) for multiple concurrently active services. A call may be associated with a RAT and/or a frequency band. For example, a call may be placed via NR (in which case the call is in accordance with NR protocol and is associated with a NR core network such as a 5G core (5GC)) or via LTE (in which case the call is in accordance with LTE protocol and is associated with an LTE core network such as an Evolved Packet System (EPS)).

In some cases, different services may be associated with different priority levels. For example, a first service may be associated with a higher priority than a second service. In some examples, each service may be associated with a priority level or priority value. For example, a configuration (such as a network configuration or an original equipment manufacturer (OEM) configuration) may indicate priority levels for different services. For example, an active voice call or video call may be associated with a first priority level, gaming traffic (e.g., on a DDS subscription) may be associated with a second priority level, an inactive or on-hold voice call or video call may be associated with a third priority level, voice signaling traffic (e.g., signaling to initiate and/or maintain a voice call) may be associated with a fourth priority level, and/or internet data traffic (and/or link list memory (LLM) gaming traffic) may be associated with a fifth priority level, among other examples. In some examples, the priority levels may indicate an order of priority (e.g., from a highest priority to a lowest priority) from the first priority level to the fifth priority level.

As described elsewhere herein, a UE may have limitations regarding combinations of services, combination of RATs, and/or combination of frequency bands for the DSDA mode. For example, the UE may be capable of placing multiple concurrent calls via a single RAT (such as NR) as part of a DSDA configuration, but the UE may not be capable of DSDA operation while placing multiple concurrent calls via different RATs (such as a first call via LTE and a second call via NR). Additionally, or alternatively, a configuration (e.g., a network configuration or an OEM configuration) may indicate one or more permissible RAT combinations and/or frequency band combinations for the DSDA mode.

A UE may initiate multiple concurrent services in a fashion that is compatible with a configuration of the UE (where a configuration indicates combinations of services on one or more DSDA compatible RAT combinations or DSDA compatible frequency band combinations). For example, the UE may initiate a first service and a second service on a RAT combination and/or a frequency band combination that is compatible with the DSDA mode. However, a mobility operation may involve switching a RAT and/or a frequency band associated with one or more of the services such that the combination of RATs and/or frequency bands, after the mobility operation, is not compatible with the DSDA mode. As another example, an action associated with a service may involve switching a RAT and/or a frequency band associated with one or more of the services such that the combination of RATs and/or frequency bands after the action is not compatible with the DSDA mode. For example, the UE may initiate a voice call on a subscription. However, initiating the voice call may require the UE to transition to a RAT or frequency band, to complete the call on the subscription, that results in a RAT combination or a frequency band combination that is not compatible with the DSDA mode. For example, LTE+NR may not be a DSDA compatible RAT combination. In some cases, when a UE is operating using the NR RAT to complete a voice call, the UE may be required to complete an EPS fallback procedure (e.g., to transition to LTE to complete the call via the LTE core network, rather than the NR core network). Transitioning to a RAT and/or a frequency band that results in a RAT combination or a frequency band combination that is not compatible with the DSDA mode may cause the UE to transition to the DSDS mode. As a result, the UE may be unable to maintain concurrent activity on multiple subscriptions (e.g., in the DSDS mode). This may result in a service being dropped, a degradation in performance of the UE, a degradation of a throughput experienced by the UE, and/or a poor user experience, among other examples.

Some techniques and apparatuses described herein enable a UE to maintain concurrent services in a dual active mode, such as the DSDA mode. For example, the UE may establish a first communication connection associated with a first service using a first subscription (e.g., a first SIM). The UE may establish a second communication connection associated with a second service using a second subscription (e.g., a second SIM). The first communication connection and the second communication connection may use a combination of RATs and/or frequency bands that are compatible with the DSDA mode. Therefore, the UE may operate in the DSDA mode for the first communication connection and the second communication connection (e.g., enabling concurrent activity for the first service and the second service). The UE may perform one or more actions to maintain operation in the DSDA mode.

For example, in some aspects, the UE may refrain from transmitting measurement reports for one subscription of the first subscription and the second subscription. The one subscription may be the subscription associated with a lower priority service. For example, the first service may be associated with a first priority, and the second service may be associated with a second priority. The UE may compare the first priority to the second priority and identify a lower priority (e.g., the first priority may be associated with a lower priority than the second priority). The UE may refrain from transmitting measurement reports for the subscription associated with the service having the lower priority (e.g., the first subscription). For example, the UE may remove one or more (or all) measurement objects associated with the first subscription to ensure that a measurement report associated with the first subscription is not transmitted by the UE. Refraining from transmitting the measurement report may ensure that the UE does not change or transition a RAT and/or a frequency band being used by the first subscription (e.g., because the UE does not transmit any measurement reports that may trigger the network to transition the UE to a different RAT and/or frequency band). As a result, a likelihood that the UE maintains a DSDA compatible RAT combination and/or a DSDA compatible frequency band combination is increased. The subscription (e.g., the second subscription) that is associated with the higher priority service may be enabled to change RATs and/or frequency bands used for the second communication connection to ensure a quality and/or reliability for the higher priority service is maintained.

As another example, the UE may detect an initiation of a voice call (e.g., an MO or MT voice call) associated with the first subscription or the second subscription. The UE may detect that a service (e.g., associated with a priority that satisfies a threshold) is ongoing on the other subscription (e.g., that is not associated with the initiated voice call). Additionally, the UE may detect that the voice call is associated with a transition to a RAT or frequency band that is not compatible with the DSDA mode. For example, assuming that LTE is a not a DSDA compatible RAT, the UE may detect that the voice call is associated with an EPS fallback procedure (e.g., to transition to LTE to complete the call via the LTE core network). The UE may reject and/or end the call based on detecting that the voice call is associated with a transition to a RAT or frequency band that is not compatible with the DSDA mode. In some aspects, the UE may transmit information to cause a notification to be displayed by the UE that indicates that the voice call was ended due to a concurrent activity of the voice call and the second service on the subscription that is not associated with the voice call. As a result, a likelihood that the UE maintains operation in the DSDA mode is increased because the voice call is rejected and/or ended by the UE without transitioning to the RAT or frequency band that is not compatible with the DSDA mode. Additionally, a user may be enabled to perform one or more actions to complete the voice call if desired based on the notification that indicates that the voice call was ended due to a concurrent activity of the voice call and the second service on the subscription that is not associated with the voice call (e.g., the user may be enabled to end the second service and re-initiate the voice call if desired).

As a result, the likelihood that the UE is enabled to maintain concurrent activities for services in the DSDA mode is increased. This increases performance and efficiency communications transmitted by the UE. Additionally, maintaining concurrent activities for services in the DSDA mode improves a throughput experienced by the UE. Further, maintaining concurrent activities for services in the DSDA mode improves a user experience.

As indicated above, FIG. 3 is provided as an example. Other examples may differ from what is described with regard to FIG. 3.

Figure 4:
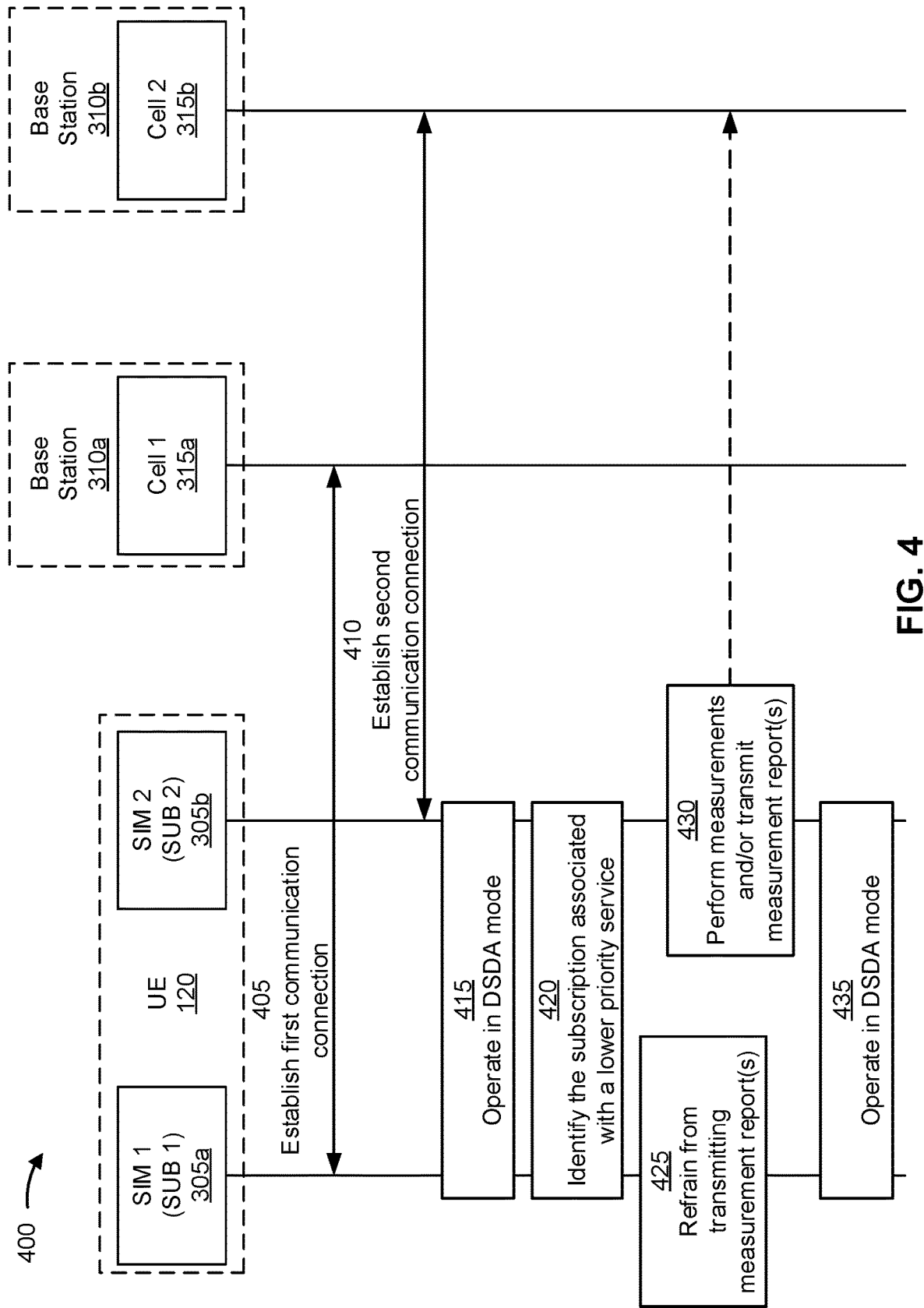
FIGS. 4 and 5 are diagrams illustrating examples associated with maintaining concurrent services in a dual active mode, in accordance with the present disclosure.

FIG. 4 is a diagram illustrating an example 400 associated with maintaining concurrent services in a dual active mode, in accordance with the present disclosure. As shown in FIG. 4, a UE 120 may communicate with the first base station 310a via the first cell 315a (shown as Cell 1) using the first SIM 305a (e.g., using the first subscription). Additionally, the UE 120 may communication with the second base station 310b via the second cell 315b (shown as Cell 2) using the second SIM 305b (e.g., using the second subscription). The UE 120 may communicate with the first base station 310a and the second base station 310b in a similar manner as described in connection with FIG. 3.

As shown by reference number 405, the UE 120 may establish, using the first subscription (e.g., using the first SIM 305a), a first communication connection with the first base station 310a. For example, the UE 120 and the first base station 310a may perform a random access channel (RACH) procedure to establish the first communication connection. The first communication connection may be associated with a first service. For example, the first communication connection may be associated with an active voice call, an active video call, gaming traffic, an inactive or on-hold voice call, an inactive or on-hold video call, voice signaling, and/or internet data traffic, among other examples. In some aspects, the first subscription and/or the first SIM 305a may be associated with communicating internet data traffic (e.g., the first subscription may be a DDS subscription). Alternatively, the first subscription and/or the first SIM 305a may not be associated with communicating internet data traffic (e.g., the first subscription may not be a DDS subscription (e.g., may be a non-DDS (nDDS) subscription)). The first service may be associated with a first priority (e.g., a first priority level or a first priority value). The first priority may indicate a service priority level associated with the traffic being communicated via the first subscription of the UE 120.

As shown by reference number 410, the UE 120 may establish, using the second subscription (e.g., using the second SIM 305b), a second communication connection with the second base station 310b. For example, the UE 120 and the second base station 310b may perform a RACH procedure to establish the second communication connection. The second communication connection may be associated with a second service. For example, the second communication connection may be associated with an active voice call, an active video call, gaming traffic, an inactive or on-hold voice call, an inactive or on-hold video call, voice signaling, and/or internet data traffic, among other examples. In some aspects, the second subscription and/or the second SIM 305b may be associated with communicating internet data traffic (e.g., the second subscription may be a DDS subscription) if the first subscription is an nDDS subscription. Alternatively, the second subscription and/or the second SIM 305b may not be associated with communicating internet data traffic (e.g., the second subscription may not be a DDS subscription or may be an nDDS subscription) if the first subscription is a DDS subscription. The second service may be associated with a second priority (e.g., a second priority level or a second priority value). The second priority may indicate a service priority level associated with the traffic being communicated via the second subscription of the UE 120.

The first communication connection may be associated with a first RAT and/or a first frequency band. The second communication connection may be associated with a second RAT and/or a second frequency band. In some aspects, the combination of the first RAT and the second RAT may be a DSDA compatible RAT combination. Similarly, the combination of the first frequency band and the second frequency band may be a DSDA compatible frequency band combination. Therefore, as shown by reference number 415, the UE 120 may operate in the DSDA mode based at least in part on establishing the first communication connection and establishing the second communication connection. For example, an upper layer, such as a non-access stratum (NAS) layer, of the UE 120 may cause a notification to be displayed via a user interface of the UE 120. The notification may indicate that the UE 120 is capable of supporting concurrent activity on the first SIM 305*a* and the second SIM 305*b*. The UE 120 may initiate the first service and/or the second service. For example, the first service may be associated with internet data traffic. The second service may be associated with an active voice call. As the UE 120 is operating in the DSDA mode, the UE 120 may be enabled to concurrently support and communicate the internet data traffic and the active voice call.

However, as described elsewhere herein, there may be restrictions associated with operating in the DSDA mode. Therefore, the UE 120 may perform one or more actions to maintain operation in the DSDA mode. For example, as described in more detail elsewhere herein, the UE 120 may stop measurements and/or refrain from transmitting measurement reports for one subscription of the UE 120 (e.g., to ensure that the subscription does not trigger a transition to a different RAT and/or frequency band). In some aspects, the UE 120 may stop measurements and/or refrain from transmitting measurement reports for the subscription associated with a lower priority service.

For example, as shown by reference number 420, the UE 120 may identify the subscription associated with a lower priority service. For example, the UE 120 may compare the first priority of the first service to the second priority of the second service. The UE 120 may determine whether the first priority or the second priority is associated with a lower priority (or is associated with a higher priority). For example, the first priority may be associated with a first priority value, and the second priority may be associated with a second priority value, where a higher priority value indicates a higher priority level. The UE 120 may identify a higher priority value from the first priority value and the second priority value. The subscription that is associated with the higher priority service may be referred to herein as a "prioritized subscription." In some aspects, the UE 120 may identify that the first priority and the second priority are associated with the same priority (e.g., the same priority value). In that case, the UE 120 may determine the prioritized subscription based at least in part on which subscription is dedicated for internet traffic (e.g., based at least in part on which subscription is the DDS subscription). For example, in the case where the first priority and the second priority are associated with the same priority, the prioritized subscription may be the DDS subscription. The nDDS subscription may be a secondary subscription (e.g., and may not be the prioritized subscription).

In some aspects, a communication connection (e.g., the first communication connection or the second communication connection) may be in an idle mode or inactive mode (e.g., a radio resource control (RRC) idle mode or an RRC inactive mode). If a communication connection is in the idle mode or the inactive mode, and the other communication connection is in an active mode or a connected mode (e.g., an RRC connected mode), then the UE 120 may determine that the subscription associated with other communication connection that is in the active mode or the connected mode is the prioritized subscription (e.g., the subscription that is associated with the communication connection in the idle mode or the inactive mode may not be the prioritized subscription).

The UE 120 may identify that the first service (e.g., associated with the first subscription and the first SIM 305*a*) is internet data traffic. The UE 120 may identify that the second service (e.g., associated with the second subscription and the second SIM 305*b*) is an active voice call. Therefore, the UE 120 may identify that the second priority (e.g., of the second service) is associated with a higher priority than the first priority (e.g., associated with the first service). Therefore, the UE 120 may determine that the second subscription is the prioritized subscription.

As a result, as shown by reference number 425, the UE 120 may refrain from transmitting a first measurement report associated with the first subscription based at least in part on the first priority of the first service and the second priority of the second service. For example, the UE 120 may refrain from transmitting any measurement reports associated with the first subscription (e.g., based at least in part on the second subscription being the prioritized subscription). The UE 120 may refrain from transmitting a first measurement report associated with the first subscription based at least in part on comparing the first priority of the first service to the second priority of the second service. The UE 120 may identify that the first priority (e.g., of the first service) is associated with a lower priority than the second priority (e.g., of the second service) and refraining from transmitting the first measurement report may be based at least in part on the first priority being associated with the lower priority than the second priority. In some aspects, such as where the first priority and the second priority are the same priority, the UE 120 may refrain from transmitting a measurement report for a secondary subscription among the first subscription and the second subscription, where the secondary subscription is not associated with communicating internet data (e.g., where the secondary subscription is the nDDS subscription). In some aspects, where the first communication connection is associated with an idle mode or an inactive mode, the UE 120 may refrain from transmitting measurement reports associated with the first subscription based at least in part on the first communication connection being associated with the idle mode or the inactive mode.

The UE 120 may transmit or provide, from an upper layer of the UE (e.g., from the NAS layer) to an RRC layer of the UE, an indication to refrain from transmitting measurement reports associated with the first subscription. The UE 120 may remove, by the RRC layer, one or more measurement objects associated with a measurement configuration for the first subscription. For example, the UE 120 may receive, from the first base station 310*a*, the measurement configuration for the first subscription. The measurement configuration may indicate the one or more measurement objects. "Measurement object" may refer to an object, or a carrier frequency and time location, on which the UE 120 is to perform measurements for intra-frequency measurements and/or inter-frequency measurements. The UE 120 may remove or clear the one or more (or all) measurement objects configured by the measurement configuration for the first subscription (e.g., from the RRC layer of the UE 120). In some aspects, rather than completely clearing or removing the one or more measurement objects, the UE 120 may ignore the one or more measurement objects. For example, the UE 120 may store information associated with the one or more measurement objects, but the UE 120 may refrain from performing measurements in accordance with the one or more measurement objects.

In addition to configuration of one or more measurement objects, the measurement configuration may also include a reporting configuration. The reporting configuration may indicate one or more triggers or reporting criterion for each measurement object. For example, for a measurement object, a reporting configuration may indicate measurement values or other criteria that will trigger the UE 120 to transmit a measurement report to the first base station 310*a*. For example, the reporting configuration may be associated with one or more measurement events, such as an event A1, an event A2, an event B1, and/or an event B2, among other examples (e.g., as defined, or otherwise fixed, by a wireless communication standard, such as the 3GPP). The measurement events may indicate inter-RAT and/or intra-RAT triggers for transmitting measurement reports. In some aspects, the UE 120 may clear or remove the reporting configuration associated with the first subscription (e.g., to ensure that no measurement reports associated with the first subscription are transmitted by the UE 120). In some aspects, rather than completely clearing or removing the reporting configurations, the UE 120 may ignore the reporting configurations. For example, the UE 120 may continue to store the reporting configurations, but if a reporting trigger or criteria is met in accordance with the reporting configuration, the UE 120 may refrain from transmitting a measurement report. In this way, the UE 120 may maintain measurements for quickly adjusting or transitioning RATs and/or frequency bands (or for performing a handover procedure) after the second subscription is no longer prioritized, as explained in more detail elsewhere herein.

As shown by reference number 430, the UE 120 may perform measurements associated with the second subscription in accordance with a measurement configuration associated with the second subscription (e.g., based at least in part on the second subscription being the prioritized subscription). In some aspects, the UE 120 may transmit, using the second subscription, a second measurement report associated with the second subscription. In other words, the UE 120 may continue mobility measurements and/or reporting for the prioritized subscription (e.g., the second subscription). In this way, the UE 120 may ensure that a quality of service and a reliability of the service associated with the prioritized subscription is maintained, while also improving the likelihood that the UE 120 continues to operate in the DSDA mode (e.g., by refraining from transmitting measurement reports associated with the first subscription to ensure that the first subscription does not transition to a RAT and/or frequency band that is not compatible with the DSDA mode).

For example, as shown by reference number 435, the UE 120 may continue to operate in the DSDA mode. The UE 120 may continue to operate in the DSDA mode based at least in part on refraining from transmitting the measurement report(s) associated with the first subscription. For example, because the UE 120 does not transmit any measurement reports associated with the first subscription, a RAT and/or a frequency band associated with the first subscription (e.g., and the first communication connection) may not be changed. For example, as the network (e.g., the first base station 310*a*) does not receive any measurement reports from the UE 120, the network may not trigger or cause the UE 120 to change the RAT and/or the frequency band associated with the first subscription. Because the RAT and/or the frequency band associated with the first subscription are compatible with the DSDA mode (e.g., because the UE 120 has already determined or detected that the UE 120 is capable of operating in the DSDA mode, as described above) and because the network may not trigger or cause the UE 120 to change the RAT and/or the frequency band associated with the first subscription, the likelihood that the UE 120 maintains operation in the DSDA mode is increased.

For example, the UE 120 may continue to operate in the DSDA mode until the second subscription (e.g., and the second communication connection) transitions to a RAT or frequency band that is not compatible with the DSDA mode. As another example, the UE 120 may continue to operate in the DSDA mode until the first communication connection is lost (e.g., until a radio link failure (RLF) is detected for the first subscription). In some aspects, the UE 120 may stop prioritizing the second subscription based at least in part on the activity or the service associated with the second service ending. In some aspects, the UE 120 may transmit, using the first subscription, a third measurement report associated with the first subscription based at least in part on detecting an RLF associated with the first subscription, based at least in part on the second subscription (e.g., and the second communication connection) transitioning to a RAT or frequency band that is not compatible with the DSDA mode, and/or based at least in part on detecting that the activity associated with the second service has ended, among other examples.

As a result, the likelihood that the UE 120 is enabled to maintain concurrent activities for services in the DSDA mode is increased. This increases performance and efficiency communications transmitted by the UE 120. Additionally, maintaining concurrent activities for services in the DSDA mode improves a throughput experienced by the UE 120. Further, maintaining concurrent activities for services in the DSDA mode improves a user experience.

As indicated above, FIG. 4 is provided as an example. Other examples may differ from what is described with respect to FIG. 4.

Figure 5:
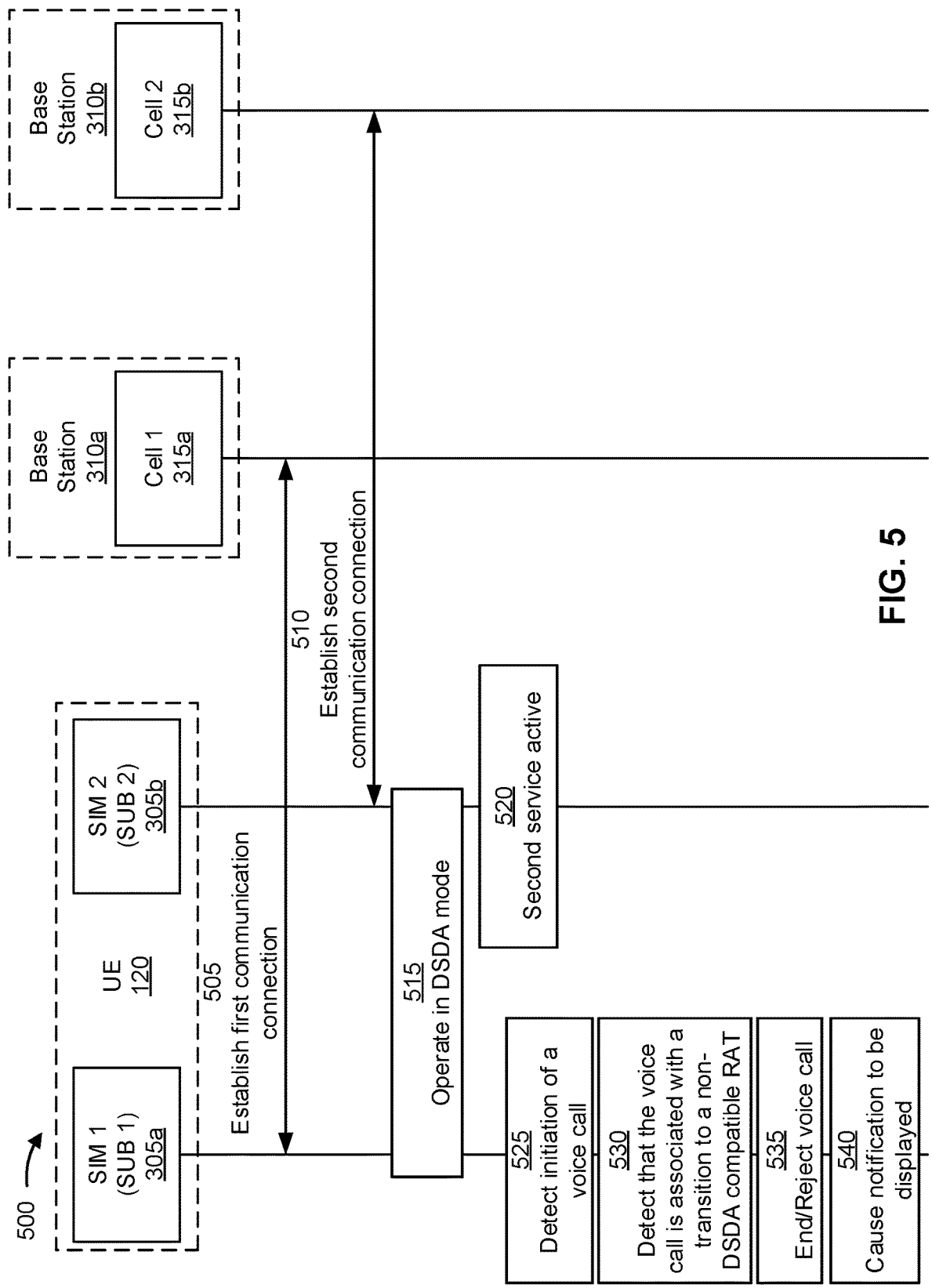

FIG. 5 is a diagram illustrating an example 500 associated with maintaining concurrent services in a dual active mode, in accordance with the present disclosure. As shown in FIG. 5, a UE 120 may communicate with the first base station 310*a* via the first cell 315*a* (shown as Cell 1) using the first SIM 305*a* (e.g., using the first subscription). Additionally, the UE 120 may communication with the second base station 310*b* via the second cell 315*b* (shown as Cell 2) using the second SIM 305*b* (e.g., using the second subscription). The UE 120 may communicate with the first base station 310*a* and the second base station 310*b* in a similar manner as described in connection with FIG. 3.

As shown by reference number 505, the UE 120 may establish, using the first subscription (e.g., using the first SIM 305*a*), a first communication connection with the first base station 310*a*. For example, the UE 120 and the first base station 310*a* may perform a RACH procedure to establish the first communication connection. The first communication connection may be associated with a first service. For example, the first communication connection may be associated with an active voice call, an active video call, gaming traffic, an inactive or on-hold voice call, an inactive or on-hold video call, voice signaling, and/or internet data traffic, among other examples. In some aspects, the first subscription and/or the first SIM 305a may be associated with communicating internet data traffic (e.g., the first subscription may be a DDS subscription). Alternatively, the first subscription and/or the first SIM 305a may not be associated with communicating internet data traffic (e.g., the first subscription may not be a DDS subscription or may be an nDDS subscription). The first service may be associated with a first priority (e.g., a first priority level or a first priority value). The first priority may indicate a service priority level associated with the traffic being communicated via the first subscription of the UE 120.

As shown by reference number 510, the UE 120 may establish, using the second subscription (e.g., using the second SIM 305b), a second communication connection with the second base station 310b. For example, the UE 120 and the second base station 310b may perform a RACH procedure to establish the second communication connection. The second communication connection may be associated with a second service. For example, the second communication connection may be associated with an active voice call, an active video call, gaming traffic, an inactive or on-hold voice call, an inactive or on-hold video call, voice signaling, and/or internet data traffic, among other examples. In some aspects, the second subscription and/or the second SIM 305b may be associated with communicating internet data traffic (e.g., the second subscription may be a DDS subscription) if the first subscription is an nDDS subscription. Alternatively, the second subscription and/or the second SIM 305b may not be associated with communicating internet data traffic (e.g., the second subscription may not be a DDS subscription or may be a nDDS subscription) if the first subscription is a DDS subscription. The second service may be associated with a second priority (e.g., a second priority level or a second priority value). The second priority may indicate a service priority level associated with the traffic being communicated via the second subscription of the UE 120.

The first communication connection may be associated with a first RAT and/or a first frequency band. The second communication connection may be associated with a second RAT and/or a second frequency band. In some aspects, the combination of the first RAT and the second RAT may be a DSDA compatible RAT combination. Similarly, the combination of the first frequency band and the second frequency band may be a DSDA compatible frequency band combination. Therefore, as shown by reference number 515, the UE 120 may operate in the DSDA mode based at least in part on establishing the first communication connection and establishing the second communication connection. For example, an upper layer, such as an NAS layer, of the UE 120 may cause a notification to be displayed via a user interface of the UE 120. The notification may indicate that the UE 120 is capable of supporting concurrent activity on the first SIM 305a and the second SIM 305b. The UE 120 may initiate the first service and/or the second service. For example, the first service may be associated with internet data traffic. The second service may be associated with an active voice call. As the UE 120 is operating in the DSDA mode, the UE 120 may be enabled to concurrently support and communicate the internet data traffic and the active voice call.

However, as described elsewhere herein, there may be restrictions associated with operating in the DSDA mode. Therefore, the UE 120 may perform one or more actions to maintain operation in the DSDA mode. For example, as described in more detail elsewhere herein, the UE 120 may detect that a voice call initiated by one of the subscriptions is associated with (or requires) a transition to a RAT and/or frequency band that is not compatible with the DSDA mode. Therefore, the UE 120 may (e.g., immediately) end or reject the voice call. The UE 120 may cause a notification to be displayed via the user interface of the UE 120 that indicates a reason for the voice call being ended or rejected (e.g., the notification may indicate that the voice call was ended due to a concurrent activity of the voice call and the second service).

In some aspects, the UE 120 may end or reject the voice call based at least in part on a priority of the second service (e.g., a priority value) satisfying a threshold. In some aspects, the UE 120 may end or reject the voice call based at least in part on the second service being associated with an active voice call or gaming activity. In other words, the UE 120 may end or reject the voice call based at least in part on the other subscription (e.g., the subscription not associated with the voice call) being associated with a higher priority service.

For example, as shown by reference number 520, the UE 120 may have an active session associated with the second service on the second subscription. As described above, the second service may be associated with a priority (e.g., a priority value) that satisfies the threshold (e.g., the second service may be associated with a high priority). In some aspects, the second service may be associated with an active voice call, an active video call, and/or gaming activity, among other examples.

As shown by reference number 525, the UE 120 may detect an initiation of a voice call associated with the first subscription. The voice call may be an MO voice call or an MT voice call. For example, for an MO voice call, the UE 120 may receive a user input initiating the voice call. For an MT voice call, the UE 120 may receive signaling (e.g., internet protocol (IP) multimedia subsystem (IMS) signaling and/or session initiation protocol (SIP) signaling) indicating the initiation of the voice call. In some aspects, such as when the second service is associated with an active voice call, the UE 120 may suspend or hold the activity associated with the second service. For example, based at least in part on detecting the initiation of the voice call, the UE 120 may place an active voice call associated with the second service and the second subscription on hold.

As shown by reference number 530, the UE 120 may detect that the voice call associated with the first subscription is associated with a transition to a RAT or frequency band that is not compatible with the DSDA mode. For example, the voice call associated with the first subscription may be associated with a transition to a RAT or a frequency band that would result in the RAT combination or frequency band combination (e.g., with the RAT and/or frequency band associated with the second subscription) of the UE 120 to not be a DSDA compatible RAT combination and/or not be a DSDA frequency band combination. For example, the first communication connection and the second communication connection may both be associated with the NR RAT. The voice call may be associated with a transition to the LTE RAT (e.g., via an EPS fallback procedure). However, the RAT combination of NR and LTE may not be a DSDA compatible RAT combination. As a result, if the UE 120 were to transition to the LTE RAT to complete the voice call on the first subscription, then the UE 120 would need to transition to operation in the DSDS mode (e.g., rather than the DSDA mode). Although the examples herein are described in connection with initiating a voice call, similar actions may be performed when a video call is initiated, and/or when another service is initiated on the first subscription, that would result in a RAT combination or a frequency band combination that is not DSDA compatible.

In some aspects, the UE 120 may detect that the voice call is associated with a transition to the RAT or the frequency band that is not compatible with the DSDA mode based at least in part on detecting that a serving cell (e.g., the first cell 315a) associated with the first subscription supports only NR voice calls via an EPS fallback procedure (e.g., where the first communication connection is associated with an NR RAT and where the RAT that is not compatible with the DSDA mode is the LTE RAT because the combination of NR+LTE is not a DSDA compatible RAT combination). For example, in some aspects, the UE 120 may receive configuration information that indicates that the serving cell associated with the first subscription supports only voice calls associated with the RAT or the frequency band that is not compatible with the DSDA mode (e.g., associated with a RAT or frequency band that will result in a RAT combination or a frequency band combination that is not compatible with the DSDA mode). For example, the first base station 310a may transmit, and the UE 120 may receive, the configuration information (e.g., an RRC configuration) that indicates that the first base station 310a and/or the first cell 315a only supports NR voice calls via the EPS fallback procedure (e.g., to the LTE RAT to complete the voice call via the LTE core network). Therefore, when the UE 120 is operating in the DSDA mode with the RAT combination of NR+NR and the configuration information indicates that the first base station 310a and/or the first cell 315a only supports NR voice calls via the EPS fallback procedure, the UE 120 may detect that the voice call is associated with a transition to the RAT or the frequency band that is not compatible with the DSDA mode.

In some aspects, the UE 120 may detect that the voice call is associated with a transition to the RAT or the frequency band that is not compatible with the DSDA mode based at least in part on receiving an indication from the first base station 310a. For example, the UE 120 may transmit, to the serving cell (e.g., to the first cell 315a) associated with the first subscription, a request to initiate the voice call. The UE 120 may receive, in response to the request to initiate the voice call and from the serving cell, a trigger to transition to the RAT or the frequency band that is not compatible with the DSDA mode. For example, the UE 120 may receive a trigger to transition to a RAT or frequency band on the first subscription (e.g., to complete the voice call) that would result in a RAT combination or a frequency band combination that is not DSDA compatible. For example, where the UE 120 is operating in the DSDA mode with a RAT combination of NR+NR and the RAT combination of NR+LTE is not DSDA compatible, the trigger may indicate to the UE 120 to perform the EPS fallback procedure. Therefore, based at least in part on the indication or the trigger received from the serving cell (e.g., from the first base station 310a and/or the first cell 315a), the UE 120 may detect that the voice call is associated with a transition to the RAT or the frequency band that is not compatible with the DSDA mode.

In some aspects, the UE 120 may detect that the voice call is associated with a transition to the RAT or the frequency band that is not compatible with the DSDA mode based at least in part on a database stored by the UE 120. For example, the UE 120 may detect, via the database, that the serving cell (e.g., the first cell 315a) associated with the first subscription supports only voice calls associated with the RAT or the frequency band that is not compatible with the DSDA mode. For example, when the UE 120 receives, from the serving cell, a trigger or indication to transition to the RAT or the frequency band that is not compatible with the DSDA mode (e.g., as described above), the UE 120 may add an entry to the database stored by the UE based at least in part on receiving the trigger. The entry may indicate that the serving cell associated with the first subscription supports only voice calls associated with the RAT or the frequency band that is not compatible with the DSDA mode. For example, the entry may indicate that the serving cell (e.g., the first cell 315a) supports NR voice calls only via the EPS fallback procedure. Therefore, where the UE 120 is operating in the DSDA mode with a RAT combination of NR+NR and the RAT combination of NR+LTE is not DSDA compatible, the UE 120 may detect (e.g., based at least in part on the entry in the database associated with the serving cell) that the voice call is associated with a transition to the RAT or the frequency band that is not compatible with the DSDA mode. The UE 120 may continually update and/or maintain the database. For example, each time the UE 120 receives, from a serving cell, a trigger to transition to a RAT and/or frequency band to complete or initiate a service (e.g., to complete a voice call for example) that would result in a RAT combination or frequency band combination that is not DSDA compatible, the UE 120 may add or create in entry in the database for the serving cell. This may enable the UE 120 to detect when initiating a voice call will result in a RAT combination or a frequency band combination that is not DSDA compatible without communicating with the serving cell (e.g., enabling the UE 120 to make the detection faster and enabling the UE 120 to conserve resources that would have otherwise been used to communicate with the serving cell to make the detection).

As shown by reference number 535, the UE 120 may end or reject the voice call associated with the first subscription. For example, based at least in part on detecting that initiating the voice call would result in a RAT combination or a frequency band combination that is not DSDA compatible, the UE 120 may end or reject the voice call associated with the first subscription to enable the UE 120 to maintain operation in the DSDA mode. For example, the UE 120 may end (e.g., terminate) an MO voice call or reject an MO voice call associated with the first subscription. In some aspects, where the serving cell transmits a trigger to transition to the RAT or the frequency band that is not compatible with the DSDA mode (e.g., in response to the UE 120 transmitting a request to initiate an MO voice call or based on initiating an MT voice call), the UE 120 may reject or ignore the trigger to transition to the RAT or the frequency band that is not compatible with the DSDA mode.

As shown by reference number 540, the UE 120 may cause a notification to be displayed by the UE 120 (e.g., via the user interface of the UE 120) that indicates a reason that the voice call was not completed. For example, the UE 120 may transmit information (e.g., from an upper layer of the UE 120 to an operating system of the UE 120) to cause the notification to be displayed by the UE 120, where the notification indicates that the voice call was ended due to a concurrent activity of the voice call and the second service. The notification may enable a user to identify that the voice call was not completed due to the concurrent activity on the second subscription. As a result, if the user desires to complete the voice call, the UE 120 may notify the user that the activity on the second subscription (e.g., the activity associated with the second service) should be ended or terminated prior to initiating the voice call associated with the first subscription again. For example, the UE 120 may receive user input to end or terminate the second service. Subsequently, the UE 120 may detect an initiation of another voice call associated with the first subscription. Because there is not concurrent high priority activity on the second subscription at the time the other voice call is initiated, the UE 120 may be enabled to initiate and complete the other voice call by transitioning to the RAT or the frequency band that is not compatible with the DSDA mode. For example, the UE 120 may be enabled to perform the EPS fallback procedure and transition to the DSDS mode to complete the other voice call because there is not concurrent high priority activity on the second subscription at the time the other voice call is initiated.

As a result, the likelihood that the UE 120 is enabled to maintain concurrent activities for services in the DSDA mode is increased because the UE 120 may not complete a voice call that would result in a RAT combination or a frequency band combination that is not DSDA compatible. This increases performance and efficiency communications transmitted by the UE 120. Additionally, maintaining concurrent activities for services in the DSDA mode improves a throughput experienced by the UE. Further, maintaining concurrent activities for services in the DSDA mode improves a user experience. For example, by causing the notification to be displayed by the UE 120 that indicates the reason that the voice call was not completed, the user experience may be improved because a user may be notified of the reason that a voice call is not completed and may be notified of actions to be taken to enable the voice call to be completed.

As indicated above, FIG. 5 is provided as an example. Other examples may differ from what is described with respect to FIG. 5.

Figure 6:
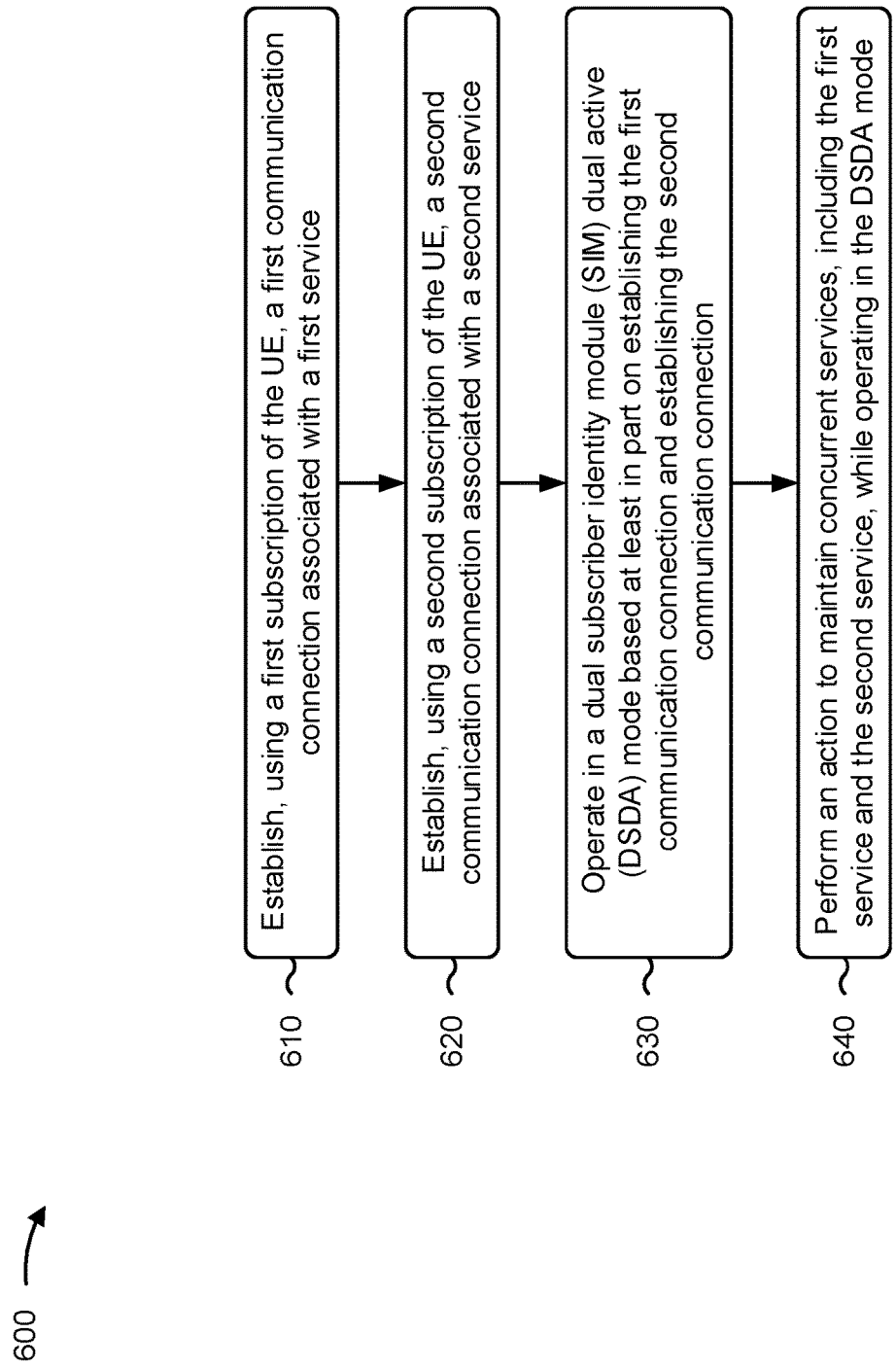
FIG. 6 is a diagram illustrating an example process associated with maintaining concurrent services in a dual active mode, in accordance with the present disclosure.

FIG. 6 is a diagram illustrating an example process 600 performed, for example, by a UE, in accordance with the present disclosure. Example process 600 is an example where the UE (e.g., the UE 120) performs operations associated with maintaining concurrent services in a dual active mode.

As shown in FIG. 6, in some aspects, process 600 may include establishing, using a first subscription of the UE, a first communication connection associated with a first service (block 610). For example, the UE (e.g., using communication manager 140 and/or connection establishment component 708, depicted in FIG. 7) may establish, using a first subscription of the UE, a first communication connection associated with a first service, as described above.

As further shown in FIG. 6, in some aspects, process 600 may include establishing, using a second subscription of the UE, a second communication connection associated with a second service (block 620). For example, the UE (e.g., using communication manager 140 and/or connection establishment component 708, depicted in FIG. 7) may establish, using a second subscription of the UE, a second communication connection associated with a second service, as described above.

As further shown in FIG. 6, in some aspects, process 600 may include operating in a DSDA mode based at least in part on establishing the first communication connection and establishing the second communication connection (block 630). For example, the UE (e.g., using communication manager 140, reception component 702, and/or transmission component 704, depicted in FIG. 7) may operate in a DSDA mode based at least in part on establishing the first communication connection and establishing the second communication connection, as described above.

As further shown in FIG. 6, in some aspects, process 600 may include performing an action to maintain concurrent services, including the first service and the second service, while operating in the DSDA mode (block 640). For example, the UE (e.g., using communication manager 140 and/or DSDA mode maintenance component 710, depicted in FIG. 7) may perform an action to maintain concurrent services, including the first service and the second service, while operating in the DSDA mode, as described above.

Process 600 may include additional aspects, such as any single aspect or any combination of aspects described below and/or in connection with one or more other processes described elsewhere herein.

In a first aspect, performing the action includes refraining from transmitting a first measurement report associated with the first subscription based at least in part on a first priority of the first service and a second priority of the second service.

In a second aspect, alone or in combination with the first aspect, process 600 includes transmitting, using the second subscription, a second measurement report associated with the second subscription.

In a third aspect, alone or in combination with one or more of the first and second aspects, the second priority is associated with a higher priority than the first priority.

In a fourth aspect, alone or in combination with one or more of the first through third aspects, process 600 includes detecting a radio link failure associated with the first subscription or that activity associated with the second service has ended, and transmitting a third measurement report associated with the first subscription based at least in part on detecting the radio link failure associated with the first subscription or that the activity associated with the second service has ended.

In a fifth aspect, alone or in combination with one or more of the first through fourth aspects, performing the action includes transmitting, from an upper layer of the UE to an RRC layer of the UE, an indication to refrain from transmitting measurement reports associated with the first subscription based at least in part on a first priority of the first service and a second priority of the second service, and removing one or more measurement objects associated with a measurement configuration for the first subscription.

In a sixth aspect, alone or in combination with one or more of the first through fifth aspects, performing the action includes comparing a first priority of the first service to a second priority of the second service, and refraining from transmitting a first measurement report associated with the first subscription based at least in part on comparing the first priority of the first service to the second priority of the second service.

In a seventh aspect, alone or in combination with one or more of the first through sixth aspects, comparing the first priority of the first service to the second priority of the second service includes identifying that the first priority is associated with a lower priority than the second priority, and refraining from transmitting the first measurement report is based at least in part on the first priority being associated with the lower priority than the second priority.

In an eighth aspect, alone or in combination with one or more of the first through seventh aspects, comparing the first priority of the first service to the second priority of the second service includes identifying that the first priority and the second priority are associated with a same priority, and refraining from transmitting a measurement report for a secondary subscription among the first subscription and the second subscription, wherein the secondary subscription is not associated with communicating internet data.

In a ninth aspect, alone or in combination with one or more of the first through eighth aspects, the second communication connection is associated with a connected mode, the first communication connection is associated with an idle mode, and performing the action includes refraining from transmitting measurement reports associated with the first subscription based at least in part on the first communication connection being associated with the idle mode.

In a tenth aspect, alone or in combination with one or more of the first through ninth aspects, the first service is associated with a voice call, and process 600 includes detecting an initiation of the voice call associated with the first subscription, and detecting that the voice call is associated with a transition to a RAT or frequency band that results in a RAT combination or a frequency band combination that is not compatible with the DSDA mode, and performing the action includes ending the voice call associated with the first subscription, and transmitting information to cause a notification to be displayed by the UE, wherein the notification indicates that the voice call was ended due to a concurrent activity of the voice call and the second service.

In an eleventh aspect, alone or in combination with one or more of the first through tenth aspects, ending the voice call associated with the first subscription is based at least in part on a priority of the second service satisfying a threshold.

In a twelfth aspect, alone or in combination with one or more of the first through eleventh aspects, ending the voice call associated with the first subscription is based at least in part on the second service being associated with an active voice call or gaming activity.

In a thirteenth aspect, alone or in combination with one or more of the first through twelfth aspects, the first communication connection is associated with an NR RAT, and the RAT that results in the RAT combination that is not compatible with the DSDA mode is an LTE RAT, and detecting that the voice call is associated with a transition to the RAT or the frequency band that is not compatible with the DSDA mode includes detecting that a serving cell associated with the first subscription supports only NR voice calls via an EPS fallback procedure.

In a fourteenth aspect, alone or in combination with one or more of the first through thirteenth aspects, detecting that the voice call is associated with the transition to the RAT or the frequency band that results in the RAT combination or the frequency band combination that is not compatible with the DSDA mode includes receiving configuration information that indicates that a serving cell associated with the first subscription supports only voice calls associated with the RAT or the frequency band that results in the RAT combination or the frequency band combination that is not compatible with the DSDA mode.

In a fifteenth aspect, alone or in combination with one or more of the first through fourteenth aspects, detecting that the voice call is associated with the transition to the RAT or the frequency band that results in the RAT combination or the frequency band combination that is not compatible with the DSDA mode includes transmitting, to a serving cell associated with the first subscription, a request to initiate the voice call, and receiving, from the serving cell, a trigger to transition to the RAT or the frequency band, wherein performing the action includes rejecting or ignoring the trigger to transition to the RAT or the frequency band.

In a sixteenth aspect, alone or in combination with one or more of the first through fifteenth aspects, process 600 includes adding an entry to a database stored by the UE based at least in part on receiving the trigger, wherein the entry indicates that the serving cell associated with the first subscription supports only voice calls associated with the RAT or the frequency band that results in the RAT combination or the frequency band combination that is not compatible with the DSDA mode.

In a seventeenth aspect, alone or in combination with one or more of the first through sixteenth aspects, detecting that the voice call is associated with the transition to the RAT or the frequency band that results in the RAT combination or the frequency band combination that is not compatible with the DSDA mode includes detecting, via a database stored by the UE, that a serving cell associated with the first subscription supports only voice calls associated with the RAT or the frequency band.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
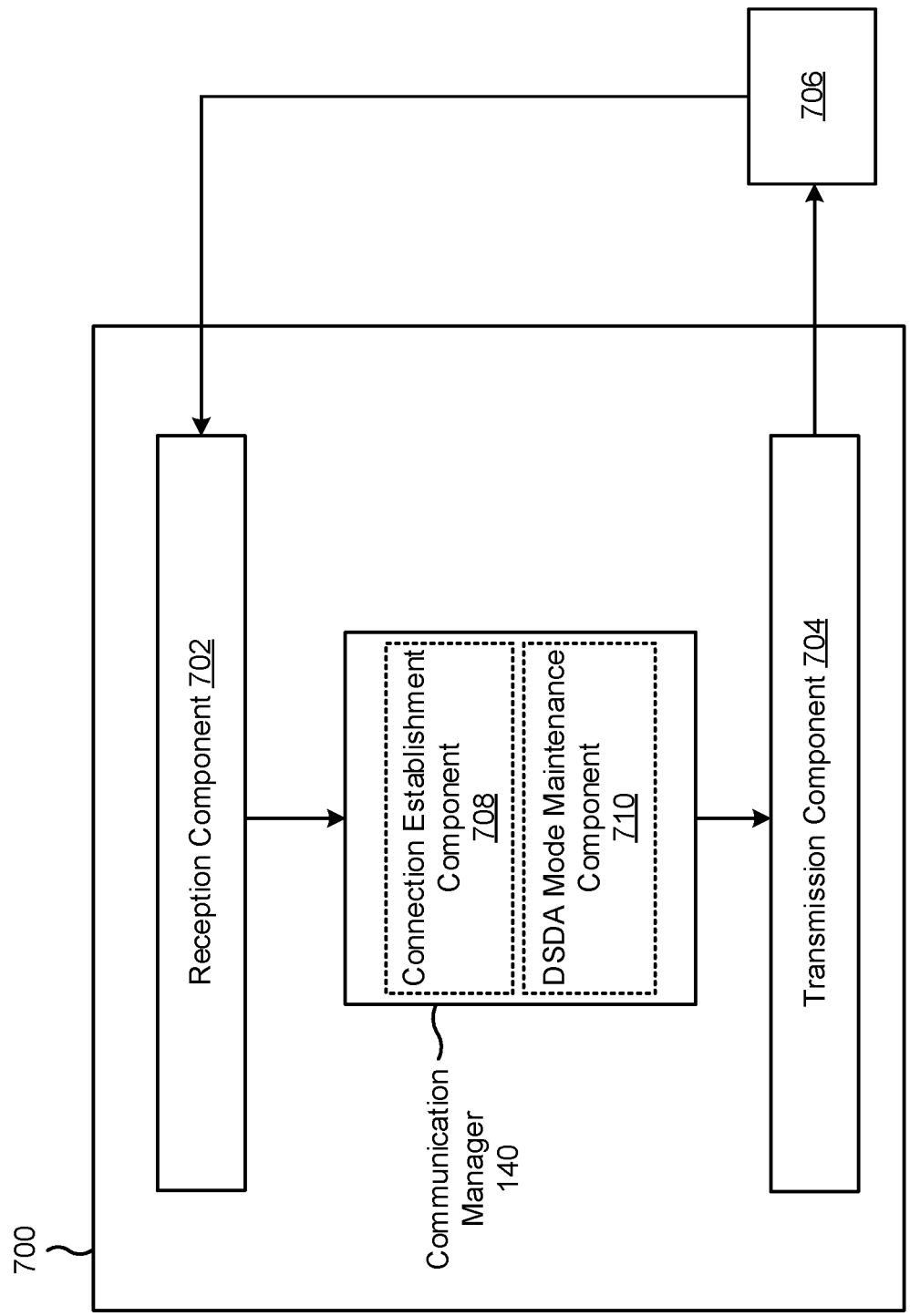
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a connection establishment component 708, and/or a DSDA mode maintenance component 710, among other examples.

In some aspects, the apparatus 700 may be configured to perform one or more operations described herein in connection with FIGS. 4-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The connection establishment component 708 may establish, using a first subscription of the UE, a first communication connection associated with a first service. The connection establishment component 708 may establish, using a second subscription of the UE, a second communication connection associated with a second service. The reception component 702 and/or the transmission component 704 may operate in a DSDA mode based at least in part on establishing the first communication connection and establishing the second communication connection. The DSDA mode maintenance component 710 may perform an action to maintain operation in the DSDA mode. For example, the DSDA mode maintenance component 710 may perform an action to maintain concurrent services, including the first service and the second service, while operating in the DSDA mode.

The DSDA mode maintenance component 710 may refrain from transmitting a first measurement report associated with the first subscription based at least in part on a first priority of the first service and a second priority of the second service.

The transmission component 704 may transmit, using the second subscription, a second measurement report associated with the second subscription.

The DSDA mode maintenance component 710 may detect a radio link failure associated with the first subscription or that activity associated with the second service has ended. The transmission component 704 may transmit a third measurement report associated with the first subscription based at least in part on detecting the radio link failure associated with the first subscription or that the activity associated with the second service has ended.

The DSDA mode maintenance component 710 may transmit, from an upper layer of the apparatus 700 to an RRC layer of the apparatus 700, an indication to refrain from transmitting measurement reports associated with the first subscription based at least in part on a first priority of the first service and a second priority of the second service. The DSDA mode maintenance component 710 may remove, from the RRC layer, one or more measurement objects associated with a measurement configuration for the first subscription.

The DSDA mode maintenance component 710 may compare a first priority of the first service to a second priority of the second service. The DSDA mode maintenance component 710 may refrain from transmitting a first measurement report associated with the first subscription based at least in part on comparing the first priority of the first service to the second priority of the second service. The DSDA mode maintenance component 710 may identify that the first priority is associated with a lower priority than the second priority, wherein refraining from transmitting the first measurement report is based at least in part on the first priority being associated with the lower priority than the second priority.

The DSDA mode maintenance component 710 may identify that the first priority and the second priority are associated with a same priority. The DSDA mode maintenance component 710 may refrain from transmitting a measurement report for a secondary subscription among the first subscription and the second subscription, wherein the secondary subscription is not associated with communicating internet data (e.g., where the secondary subscription is an nDDS subscription).

The DSDA mode maintenance component 710 may refrain from transmitting measurement reports associated with the first subscription based at least in part on the first communication connection being associated with the idle state.

The DSDA mode maintenance component 710 may detect an initiation of the voice call associated with the first subscription. The DSDA mode maintenance component 710 may detect that the voice call is associated with a transition to a RAT or frequency band that results in a RAT combination or a frequency band combination that is not compatible with the DSDA mode. The DSDA mode maintenance component 710 may end the voice call associated with the first subscription. The DSDA mode maintenance component 710 may transmit information to cause a notification to be displayed by the UE, wherein the notification indicates that the voice call was ended due to a concurrent activity of the voice call and the second service.

The DSDA mode maintenance component 710 may detect that a serving cell associated with the first subscription supports only NR voice calls via an EPS fallback procedure.

The reception component 702 may receive configuration information that indicates that a serving cell associated with the first subscription supports only voice calls associated with the RAT or the frequency band that results in the RAT combination or the frequency band combination that is not compatible with the DSDA mode.

The transmission component 704 may transmit, to a serving cell associated with the first subscription, a request to initiate the voice call. The reception component 702 may receive, from the serving cell, a trigger to transition to the RAT or the frequency band. The DSDA mode maintenance component 710 may reject or ignore the trigger to transition to the RAT or the frequency band.

The DSDA mode maintenance component 710 may add an entry to a database stored by the UE based at least in part on receiving the trigger, wherein the entry indicates that the serving cell associated with the first subscription supports only voice calls associated with the RAT or the frequency band that results in the RAT combination or the frequency band combination that is not compatible with the DSDA mode.

The DSDA mode maintenance component 710 may detect, via a database stored by the UE, that a serving cell associated with the first subscription supports only voice calls associated with the RAT or the frequency band.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: establishing, using a first subscription of the UE, a first communication connection associated with a first service; establishing, using a second subscription of the UE, a second communication connection associated with a second service; operating in a dual subscriber identity module (SIM) dual active (DSDA) mode based at least in part on establishing the first communication connection and establishing the second communication connection; and performing an action to maintain concurrent services, including the first service and the second service, while operating in the DSDA mode.

Aspect 2: The method of Aspect 1, wherein performing the action comprises: refraining from transmitting a first measurement report associated with the first subscription based at least in part on a first priority of the first service and a second priority of the second service.

Aspect 3: The method of Aspect 2, further comprising: transmitting, using the second subscription, a second measurement report associated with the second subscription.

Aspect 4: The method of any of Aspects 2-3, wherein the second priority is associated with a higher priority than the first priority.

Aspect 5: The method of any of Aspects 2-4, further comprising: detecting a radio link failure associated with the first subscription or that activity associated with the second service has ended; and transmitting a third measurement report associated with the first subscription based at least in part on detecting the radio link failure associated with the first subscription or that the activity associated with the second service has ended.

Aspect 6: The method of any of Aspects 1-5, wherein performing the action comprises: transmitting, from an upper layer of the UE to a radio resource control (RRC) layer of the UE, an indication to refrain from transmitting measurement reports associated with the first subscription based at least in part on a first priority of the first service and a second priority of the second service; and removing, by the RRC layer, one or more measurement objects associated with a measurement configuration for the first subscription.

Aspect 7: The method of any of Aspects 1-6, wherein performing the action comprises: comparing a first priority of the first service to a second priority of the second service; and refraining from transmitting the first measurement report associated with the first subscription based at least in part on comparing the first priority of the first service to the second priority of the second service.

Aspect 8: The method of Aspect 7, wherein comparing the first priority of the first service to the second priority of the second service comprises: identifying that the first priority is associated with a lower priority than the second priority, wherein refraining from transmitting the first measurement report is based at least in part on the first priority being associated with the lower priority than the second priority.

Aspect 9: The method of Aspect 7, wherein comparing the first priority of the first service to the second priority of the second service comprises: identifying that the first priority and the second priority are associated with a same priority; and refraining from transmitting a measurement report for a secondary subscription among the first subscription and the second subscription, wherein the secondary subscription is not associated with communicating internet data.

Aspect 10: The method of any of Aspects 1-9, where the second communication connection is associated with a connected mode, wherein the first communication connection is associated with an idle mode, and wherein performing the action comprises: refraining from transmitting measurement reports associated with the first subscription based at least in part on the first communication connection being associated with the idle mode.

Aspect 11: The method of any of Aspects 1-10, wherein the first service is associated with a voice call, the method further comprising: detecting an initiation of the voice call associated with the first subscription; and detecting that the voice call is associated with a transition to a radio access technology (RAT) or frequency band that results in a RAT combination or a frequency band combination that is not compatible with the DSDA mode, wherein performing the action comprises: ending the voice call associated with the first subscription; and transmitting information to cause a notification to be displayed by the UE, wherein the notification indicates that the voice call was ended due to a concurrent activity of the voice call and the second service.

Aspect 12: The method of Aspect 11, wherein ending the voice call associated with the first subscription is based at least in part on a priority of the second service satisfying a threshold.

Aspect 13: The method of any of Aspects 11-12, wherein ending the voice call associated with the first subscription is based at least in part on the second service being associated with an active voice call or gaming activity.

Aspect 14: The method of any of Aspects 11-13, wherein the first communication connection is associated with a New Radio (NR) RAT, and wherein the RAT that results in the RAT combination that is not compatible with the DSDA mode is a Long Term Evolution (LTE) RAT, and wherein detecting that the voice call is associated with a transition to the RAT or the frequency band that is not compatible with the DSDA mode comprises: detecting that a serving cell associated with the first subscription supports only NR voice calls via an Evolved Packet System (EPS) fallback procedure.

Aspect 15: The method of any of Aspects 11-14, wherein detecting that the voice call is associated with the transition to the RAT or the frequency band that results in the RAT combination or the frequency band combination that is not compatible with the DSDA mode comprises: receiving configuration information that indicates that a serving cell associated with the first subscription supports only voice calls associated with the RAT or the frequency band that results in the RAT combination or the frequency band combination that is not compatible with the DSDA mode.

Aspect 16: The method of any of Aspects 11-14, wherein detecting that the voice call is associated with the transition to the RAT or the frequency band that results in the RAT combination or the frequency band combination that is not compatible with the DSDA mode comprises: transmitting, to a serving cell associated with the first subscription, a request to initiate the voice call; and receiving, from the serving cell, a trigger to transition to the RAT or the frequency band, wherein performing the action comprises: rejecting or ignoring the trigger to transition to the RAT or the frequency band.

Aspect 17: The method of Aspect 16, further comprising: adding an entry to a database stored by the UE based at least in part on receiving the trigger, wherein the entry indicates that the serving cell associated with the first subscription supports only voice calls associated with the RAT or the frequency band that results in the RAT combination or the frequency band combination that is not compatible with the DSDA mode.

Aspect 18: The method of any of Aspects 11-17, wherein detecting that the voice call is associated with the transition to the RAT or the frequency band that results in the RAT combination or the frequency band combination that is not compatible with the DSDA mode comprises: detecting, via a database stored by the UE, that a serving cell associated with the first subscription supports only voice calls associated with the RAT or the frequency band.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      establish, using a first subscription of the UE, a first communication connection associated with a first service;
      establish, using a second subscription of the UE, a second communication connection associated with a second service;
      operate in a dual subscriber identity module (SIM) dual active (DSDA) mode based at least in part on establishing the first communication connection and establishing the second communication connection; and perform an action to maintain concurrent services, including the first service and the second service, while operating in the DSDA mode, wherein performance of the action is based at least in part on one or more of:
  a first priority of the first service and a second priority of the second service, or
  an initiation of a voice call associated with the first subscription.

2. The UE of claim 1, wherein the one or more processors, to perform the action, are configured to:
refrain from transmitting a first measurement report associated with the first subscription based at least in part on the first priority of the first service and the second priority of the second service.

3. The UE of claim 2, wherein the one or more processors are further configured to:
transmit, using the second subscription, a second measurement report associated with the second subscription.

4. The UE of claim 2, wherein the one or more processors are further configured to:
detect a radio link failure associated with the first subscription or that activity associated with the second service has ended; and
transmit a third measurement report associated with the first subscription based at least in part on detecting the radio link failure associated with the first subscription or that the activity associated with the second service has ended.

5. The UE of claim 1, wherein the one or more processors, to perform the action, are configured to:
transmit, from an upper layer of the UE to a radio resource control (RRC) layer of the UE, an indication to refrain from transmitting measurement reports associated with the first subscription based at least in part on the first priority of the first service and the second priority of the second service; and
remove, from the RRC layer, one or more measurement objects associated with a measurement configuration for the first subscription.

6. The UE of claim 1, wherein the one or more processors, to perform the action, are configured to:
compare the first priority of the first service to the second priority of the second service; and
refrain from transmitting a first measurement report associated with the first subscription based at least in part on comparing the first priority of the first service to the second priority of the second service, wherein the first priority is associated with a lower priority than the second priority.

7. The UE of claim 6, wherein the one or more processors, to compare the first priority of the first service to the second priority of the second service, are configured to:
identify that the first priority and the second priority are associated with a same priority; and
refrain from transmitting a measurement report for a secondary subscription among the first subscription and the second subscription, wherein the secondary subscription is not associated with communicating internet data.

8. The UE of claim 1, where the second communication connection is associated with a connected mode, wherein the first communication connection is associated with an idle mode, and wherein the one or more processors, to perform the action, are configured to:
refrain from transmitting measurement reports associated with the first subscription based at least in part on the first communication connection being associated with the idle mode.

9. The UE of claim 1, wherein the first service is associated with the voice call, and wherein the one or more processors are further configured to:
detect the initiation of the voice call associated with the first subscription; and
detect that the voice call is associated with a transition to a radio access technology (RAT) or frequency band that results in a RAT combination or a frequency band combination that is not compatible with the DSDA mode, and wherein the one or more processors, to perform the action, are configured to:
end the voice call associated with the first subscription; and
transmit information to cause a notification to be displayed by the UE, wherein the notification indicates that the voice call was ended due to a concurrent activity of the voice call and the second service.

10. The UE of claim 9, wherein ending the voice call associated with the first subscription is based at least in part on at least one of a priority of the second service satisfying a threshold or the second service being associated with an active voice call or gaming activity.

11. The UE of claim 9, wherein the first communication connection is associated with a New Radio (NR) RAT, and wherein the RAT that results in the RAT combination that is not compatible with the DSDA mode is a Long Term Evolution (LTE) RAT, and wherein the one or more processors, to detect that the voice call is associated with a transition to the RAT or the frequency band that is not compatible with the DSDA mode, are configured to:
detect that a serving cell associated with the first subscription supports only NR voice calls via an Evolved Packet System (EPS) fallback procedure.

12. The UE of claim 9, wherein the one or more processors, to detect that the voice call is associated with the transition to the RAT or the frequency band that results in the RAT combination or the frequency band combination that is not compatible with the DSDA mode, are configured to:
receive configuration information that indicates that a serving cell associated with the first subscription supports only voice calls associated with the RAT or the frequency band that results in the RAT combination or the frequency band combination that is not compatible with the DSDA mode.

13. The UE of claim 9, wherein the one or more processors, to detect that the voice call is associated with the transition to the RAT or the frequency band that results in the RAT combination or the frequency band combination that is not compatible with the DSDA mode, are configured to:
transmit, to a serving cell associated with the first subscription, a request to initiate the voice call; and
receive, from the serving cell, a trigger to transition to the RAT or the frequency band, wherein the one or more processors, to perform the action, are configured to:
reject or ignore the trigger to transition to the RAT or the frequency band.

14. The UE of claim 13, wherein the one or more processors are further configured to:
add an entry to a database stored by the UE based at least in part on receiving the trigger, wherein the entry indicates that the serving cell associated with the first subscription supports only voice calls associated with the RAT or the frequency band that results in the RAT combination or the frequency band combination that is not compatible with the DSDA mode.

15. A method of wireless communication performed by a user equipment (UE), comprising:
establishing, using a first subscription of the UE, a first communication connection associated with a first service;
establishing, using a second subscription of the UE, a second communication connection associated with a second service;
operating in a dual subscriber identity module (SIM) dual active (DSDA) mode based at least in part on establishing the first communication connection and establishing the second communication connection; and
performing an action to maintain concurrent services, including the first service and the second service, while operating in the DSDA mode, wherein performing the action is based at least in part on one or more of:
a first priority of the first service and a second priority of the second service, or
an initiation of a voice call associated with the first subscription.

16. The method of claim 15, wherein performing the action comprises:
refraining from transmitting a first measurement report associated with the first subscription based at least in part on the first priority of the first service and the second priority of the second service.

17. The method of claim 16, further comprising:
transmitting, using the second subscription, a second measurement report associated with the second subscription.

18. The method of claim 16, further comprising:
detecting a radio link failure associated with the first subscription or that activity associated with the second service has ended; and
transmitting a third measurement report associated with the first subscription based at least in part on detecting the radio link failure associated with the first subscription or that the activity associated with the second service has ended.

19. The method of claim 15, wherein performing the action comprises:
transmitting, from an upper layer of the UE to a radio resource control (RRC) layer of the UE, an indication to refrain from transmitting measurement reports associated with the first subscription based at least in part on the first priority of the first service and the second priority of the second service; and
removing, by the RRC layer, one or more measurement objects associated with a measurement configuration for the first subscription.

20. The method of claim 15, wherein performing the action comprises:
comparing the first priority of the first service to the second priority of the second service; and
refraining from transmitting a first measurement report associated with the first subscription based at least in part on comparing the first priority of the first service to the second priority of the second service.

21. The method of claim 20, wherein comparing the first priority of the first service to the second priority of the second service comprises:
refraining from transmitting a measurement report for a secondary subscription among the first subscription and the second subscription based at least in part on the first priority and the second priority being associated with a same priority, wherein the secondary subscription is not associated with communicating internet data.

22. The method of claim 15, where the second communication connection is associated with a connected mode, wherein the first communication connection is associated with an idle mode, and wherein performing the action comprises:
refraining from transmitting measurement reports associated with the first subscription based at least in part on the first communication connection being associated with the idle mode.

23. The method of claim 15, wherein the first service is associated with the voice call, the method further comprising:
detecting the initiation of the voice call associated with the first subscription; and
detecting that the voice call is associated with a transition to a radio access technology (RAT) or frequency band that results in a RAT combination or a frequency band combination that is not compatible with the DSDA mode, wherein performing the action comprises:
ending the voice call associated with the first subscription; and
transmitting information to cause a notification to be displayed by the UE, wherein the notification indicates that the voice call was ended due to a concurrent activity of the voice call and the second service.

24. The method of claim 23, wherein ending the voice call associated with the first subscription is based at least in part on at least one of a priority of the second service satisfying a threshold or the second service being associated with an active voice call or gaming activity.

25. The method of claim 23, wherein the first communication connection is associated with a New Radio (NR) RAT, and wherein the RAT that results in the RAT combination that is not compatible with the DSDA mode is a Long Term Evolution (LTE) RAT, and wherein detecting that the voice call is associated with a transition to the RAT or the frequency band that is not compatible with the DSDA mode comprises:
detecting that a serving cell associated with the first subscription supports only NR voice calls via an Evolved Packet System (EPS) fallback procedure.

26. The method of claim 23, wherein detecting that the voice call is associated with the transition to the RAT or the frequency band that results in the RAT combination or the frequency band combination that is not compatible with the DSDA mode comprises:
receiving configuration information that indicates that a serving cell associated with the first subscription supports only voice calls associated with the RAT or the frequency band that results in the RAT combination or the frequency band combination that is not compatible with the DSDA mode.

27. The method of claim 23, wherein detecting that the voice call is associated with the transition to the RAT or the frequency band that results in the RAT combination or the frequency band combination that is not compatible with the DSDA mode comprises:
transmitting, to a serving cell associated with the first subscription, a request to initiate the voice call; and receiving, from the serving cell, a trigger to transition to the RAT or the frequency band, wherein performing the action comprises:

rejecting or ignoring the trigger to transition to the RAT or the frequency band.

28. The method of claim 23, wherein detecting that the voice call is associated with the transition to the RAT or the frequency band that results in the RAT combination or the frequency band combination that is not compatible with the DSDA mode comprises:

detecting, via a database stored by the UE, that a serving cell associated with the first subscription supports only voice calls associated with the RAT or the frequency band.

29. A non-transitory computer-readable medium storing a set of instructions for wireless communication, the set of instructions comprising:

one or more instructions that, when executed by one or more processors of a user equipment (UE), cause the UE to:

establish, using a first subscription of the UE, a first communication connection associated with a first service;

establish, using a second subscription of the UE, a second communication connection associated with a second service;

operate in a dual subscriber identity module (SIM) dual active (DSDA) mode based at least in part on establishing the first communication connection and establishing the second communication connection; and perform an action to maintain concurrent services, including the first service and the second service, while operating in the DSDA mode, wherein performance of the action is based at least in part on one or more of:

a first priority of the first service and a second priority of the second service, or an initiation of a voice call associated with the first subscription.

30. An apparatus for wireless communication, comprising:

means for establishing, using a first subscription of the apparatus, a first communication connection associated with a first service;

means for establishing, using a second subscription of the apparatus, a second communication connection associated with a second service;

means for operating in a dual subscriber identity module (SIM) dual active (DSDA) mode based at least in part on establishing the first communication connection and establishing the second communication connection; and means for performing an action to maintain concurrent services, including the first service and the second service, while operating in the DSDA mode, wherein performance of the action is based at least in part on one or more of:

a first priority of the first service and a second priority of the second service, or an initiation of a voice call associated with the first subscription.

* * * * *